United States Patent
Berset et al.

(10) Patent No.: US 9,663,963 B2
(45) Date of Patent: May 30, 2017

(54) DEVICE FOR INTRODUCING A FORCE INTO TENSION MEMBERS MADE OF FIBER-REINFORCED PLASTIC FLAT STRIP LAMELLAS

(71) Applicant: SIKA TECHNOLOGY AG, Baar (CH)

(72) Inventors: Thierry Berset, Winterthur (CH); Heinz Bänziger, Freienstein (CH); Patrik Horisberger, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/768,212

(22) Filed: Feb. 15, 2013

(65) Prior Publication Data
US 2013/0160394 A1    Jun. 27, 2013

Related U.S. Application Data

(63) Continuation of application No. PCT/EP2011/064225, filed on Aug. 18, 2011.

(30) Foreign Application Priority Data

Aug. 18, 2010    (EP) .................... 10173179

(51) Int. Cl.
*E04G 23/02* (2006.01)
*E04C 5/12* (2006.01)
*F16B 2/14* (2006.01)

(52) U.S. Cl.
CPC .......... *E04G 23/0218* (2013.01); *E04C 5/122* (2013.01); *E04C 5/127* (2013.01); *F16B 2/14* (2013.01); *Y10T 24/44932* (2015.01)

(58) Field of Classification Search
CPC .......... E04C 5/122; E04C 5/127; F16G 11/00; E04G 23/0218; F16B 11/008

(Continued)

(56) References Cited

U.S. PATENT DOCUMENTS 2,737,802 A * 3/1956 Bakker .................. 52/223.13
2,897,563 A * 8/1959 Jonovich ................ B64C 13/30
                                                    174/94 S (Continued)

FOREIGN PATENT DOCUMENTS

AT       412564 B    4/2005
CN     1898450 A    1/2007

(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Feb. 28, 2013, issued in corresponding International Application No. PCT/EP2011/064225. (18 pages).

(Continued)

*Primary Examiner* — Brian Glessner
*Assistant Examiner* — Omar Hijaz
(74) *Attorney, Agent, or Firm* — Buchanan Ingersoll & Rooney PC

(57) ABSTRACT

The disclosure relates to a device and method for introducing a force into tension members made of fiber-reinforced plastic flat strip lamella. The device can include at least one clamping element, which is arranged on the tension member and has at least one contact face with the tension member. At least one rigid sleeve can be arranged around the at least one clamping element and the tension member and thereby exerts a clamping pressure on the tension member via the clamping element. The clamping element can be formed of plastic material having a modulus of elasticity ranging between 1000 and 5000 MPa, bending tensile strength of ≥25 MPa and pressure resistance of ≥25 MPa.

16 Claims, 7 Drawing Sheets

(58) Field of Classification Search
USPC ... 52/125.2, 125.4, 125.5, 223.13, 704, 706, 52/712; 403/367, 267–269
See application file for complete search history.

(56) References Cited

U.S. PATENT DOCUMENTS

| | | | | |
|---|---|---|---|---|
| 3,698,749 | A * | 10/1972 | Yonkers | 403/197 |
| 3,701,554 | A * | 10/1972 | Puyo et al. | 403/209 |
| 4,120,130 | A * | 10/1978 | Puschkarski | 52/282.5 |
| 4,130,926 | A * | 12/1978 | Willem | 29/419.2 |
| 4,553,876 | A * | 11/1985 | Arntyr | E02D 3/10 405/133 |
| 4,822,201 | A * | 4/1989 | Iwasaki et al. | 403/268 |
| 5,211,500 | A * | 5/1993 | Takaki et al. | 403/269 |
| 5,713,169 | A | 2/1998 | Meier et al. | |
| 5,762,438 | A * | 6/1998 | Reed, II | 403/269 |
| 6,146,049 | A * | 11/2000 | Faris | A44B 15/00 24/664 |
| 6,584,738 | B1 * | 7/2003 | Andra et al. | 52/223.14 |
| 6,886,484 | B2 * | 5/2005 | Thomas | 114/108 |
| 6,957,485 | B2 * | 10/2005 | Campbell | 29/858 |
| 7,441,380 | B2 * | 10/2008 | Andra et al. | 52/223.13 |
| 7,857,542 | B2 | 12/2010 | Burtscher | |
| 2002/0088096 | A1 * | 7/2002 | James | F16B 2/065 24/115 R |
| 2003/0010966 | A1 * | 1/2003 | Sjostedt | 254/231 |
| 2004/0216403 | A1 * | 11/2004 | Andra | 52/223.1 |
| 2004/0261330 | A1 * | 12/2004 | Oliver et al. | 52/155 |
| 2006/0196146 | A1 * | 9/2006 | Schwegler | 52/741.15 |
| 2007/0017689 | A1 * | 1/2007 | Polidori | H02G 7/056 174/84 C |
| 2007/0221894 | A1 * | 9/2007 | Burtscher | E04C 5/07 254/104 |
| 2007/0294967 | A1 * | 12/2007 | Posselt | E04B 2/702 52/233 |
| 2008/0295438 | A1 * | 12/2008 | Knauseder | 52/589.1 |
| 2009/0020055 | A1 * | 1/2009 | Hillenbrand | D05C 11/04 112/226 |
| 2009/0031667 | A1 * | 2/2009 | Ruegg et al. | 52/712 |
| 2009/0044483 | A1 * | 2/2009 | Schwegler | 52/712 |
| 2009/0074538 | A1 * | 3/2009 | Richie | 411/516 |

FOREIGN PATENT DOCUMENTS

| | | |
|---|---|---|
| DE | 10060459 A1 | 4/2002 |
| EP | 0949389 A1 | 10/1999 |
| WO | WO 2004/003316 A1 | 1/2004 |
| WO | WO 2005/061813 A1 | 7/2005 |

OTHER PUBLICATIONS

International Search Report (PCT/ISA/210) issued on Sep. 30, 2011, by the European Patent Office as the International Searching Authority for International Application No. PCT/EP2011/064225.
Written Opinion (PCT/ISA/237) issued on Sep. 30, 2011, by the European Patent Office as the International Searching Authority for International Application No. PCT/EP2011/064225.
Notification of the First Office Action issued on Jan. 21, 2014, by the Chinese Patent Office in corresponding Chinese Patent Application No. 201180007161.8, and an English Translation of the Office Action. (18 pages).
Office Action issued on Jul. 6, 2016, by the Chilean Patent Office in corresponding Chilean Patent Application No. 2013-000386, and an English Translation of the Office Action. (14 pages).
Office Action issued on Jul. 8, 2016, by the European Patent Office in corresponding European Patent Application No. 11 746 531.0, and an English Translation of the Office Action. (7 pages).
Office Action (Inquiry) of the Substantive Examination issued on May 26, 2016, by the Russian Patent Office in corresponding Russian Patent Application No. 2013102120/03, and an English Translation of the Office Action. (6 pages).
Office Action issued Feb. 19, 2016 by the Chinese Patent Office in corresponding Chinese Patent Application No. 201180007161.8, and an English translation thereof (11 pages).
"Technik Tabellen—Kunststoff (Art Table—Plastic)", Found on the Internet: URL: http://www.hug-technik.com/inhaltita/kunststoff.html, Found on Nov. 30, 2015, (2 pages).
Office Action issued on Dec. 4, 2015, by the European Patent Office in corresponding European Patent Application No. 11746531.0, and an English Translation of the Office Action. (9 pages).
Office Action issued on Oct. 24, 2016, by the Canadian Intellectual Property Office in corresponding Canadian Patent Application No. 2,808,110. (8 pages).
Office Action (Patent Examination Report No. 1) issued on Nov. 29, 2016, by the Australian Patent Office in corresponding Australian Patent Application No. 2016204282. (3 pages).

* cited by examiner

US 9,663,963 B2

DEVICE FOR INTRODUCING A FORCE INTO TENSION MEMBERS MADE OF FIBER-REINFORCED PLASTIC FLAT STRIP LAMELLAS

RELATED APPLICATION(S)

This application claims priority as a continuation application under 35 U.S.C. §120 to PCT/EP2011/064225, which was filed as an International Application on Aug. 18, 2011 designating the U.S., and which claims priority to European Application 10173179.2 filed in Europe on Aug. 18, 2010. The entire contents of these applications are hereby incorporated by reference in their entireties.

FIELD

The disclosure relates to a device for introducing a force into tension members made of fiber-reinforced plastic flat strip lamellas, to a method for introducing a force into such tension members, a method involving a device disclosed herein, tension members that include one or more devices in accordance with the disclosure, as well as a method for reinforcing supporting frameworks via devices disclosed herein.

BACKGROUND INFORMATION

The reinforcing of supporting frameworks, for example, in the renovation of existing buildings by applying tension members made of fiber-reinforced plastic flat strip lamellas that are adhered under tension to the supporting framework, is known and can have advantages over reinforcing of supporting frameworks by steel constructions. Because the introduction of force into the tension members can take place via their end, anchoring on the tension sides of the supporting framework can be significant.

Different systems are known for the end anchoring but also for the pretensioning of tension members made of fiber-reinforced plastic flat strip lamellas including systems which can take into account the specifications when dealing with fiber-reinforced plastic flat strip lamellas.

For example, WO 2005/061813 A1 describes anchorings for tension members including two wedges and one anchor body which represents essentially a sleeve for the wedges, whereby a second, again wedge-shaped layer, is arranged between the wedges and the tension member. This second wedge-shaped layer includes a material with a lower modulus of elasticity than that of the first wedges and sleeve material and is arranged in the device in such a manner that the greatest thickness of this layer is provided in the area close to the load. This arrangement is for providing a uniform distribution of the contact pressure and of the shearing stress between the wedges and the tension member. The introduction of force into the tension member takes place in the described system via the sleeve (e.g., via the support of the sleeve on the supporting framework to be reinforced).

Devices described in WO 2005/061813 A1 can include wedges with different forms and materials used, as a result of which the manufacture of the device as well as its correct arrangement on a tension member can be associated with a higher cost.

The device of WO 2005/061813 also involves introduction of force into the tension member via the sleeve. As a result, the design of the device is basically limited in such a manner that the wedges have a reduction of cross-section in the direction of tension of the tension member because they can otherwise exit out of the sleeve upon loading.

WO 2004/003316 A1 describes a device for introducing force into tension members including substantially two wedges that are arranged around the tension member and are driven into a sleeve. The tension member is provided on its ends with means for imparting adhesion. The wedges include a highly rigid material.

The anchoring of tension members made of fiber-reinforced plastic flat strip lamellas by wedge anchorings uses a uniform distribution of stress in the boundary surface of the wedges and of the tension member in the longitudinal direction as well as in the transverse direction.

This distribution of stress can take place in an insufficient manner by the use of highly rigid material for the wedges, as they are described in WO 2004/003316 A1, as a result of which the efficiency of the introduction of force into the tension member can be limited. A balanced distribution of stress can be achieved in such an embodiment with great expense and high precision for the shaping of the wedges and their arrangement in the sleeve.

SUMMARY

A device is disclosed for introducing force into a tension member made with a fiber-reinforced plastic flat strip lamella, comprising: at least one clamping element for arrangement on a tension member and having at least one contact surface for contact with the tension member; and at least one rigid sleeve for arrangement around the clamping element and the tension member for providing a clamping pressure via the clamping element on the tension member, wherein the clamping element is made of plastic that has a modulus of elasticity ranging from 1000 to 5000 MPa, a bending tensile strength of ≥25 MPa and a pressure resistance of ≥25 MPa.

A method is disclosed for introduction of force into tension members made of fiber-reinforced plastic flat strip lamellas, comprising: placing a tension member on at least one clamping element made of plastic having a modulus of elasticity ranging from 1000 to 5000 MPa, a bending tensile strength of ≥25 MPa and a pressure resistance of ≥25 MPa so that the clamping element has at least one contact surface with the tension member; pushing or drawing a rigid sleeve over the at least one clamping element and the tension member so that a clamping pressure is exerted on the tension member; placing a tension device on the at least one clamping element with the sleeve arranged on the tension member; and introducing a force into the tension member by the tension device.

A method is disclosed for introduction of force into tension members made of fiber-reinforced plastic flat strip lamellas, comprising: providing a tension member that is anchored by one end on a supporting framework; placing a tension device on a non-anchored end of the tension member; tensioning the tension member by the tension device; placing at least one clamping element made of plastic having a modulus of elasticity ranging from 1000 to 5000 MPa, a bending tensile strength of ≥25 MPa and a pressure resistance of ≥25 MPa on the non-anchored end of the tensioned tension member so that the clamping element has at least one contact surface with the tension member; pushing or drawing a rigid sleeve over the at least one clamping element and the tension member so that a clamping pressure is exerted on the tension member; and anchoring a non-anchored end of the tension member.

A method is disclosed for reinforcing a supporting framework, comprising: providing a tension member made of fiber-reinforced plastic flat strip lamellas; arranging at least one clamping element on the tension member, the clamping element having at least one contact surface with the tension member; arranging at least one rigid sleeve around the clamping element and the tension member and providing a clamping pressure via the clamping element on the tension member, wherein the clamping element is made of plastic that has a modulus of elasticity ranging from 1000 to 5000 MPa, a bending tensile strength of ≥25 MPa and a pressure resistance of ≥25 MPa; fastening a bipartite traction device including an anchoring and traction element in edge areas of a position of the supporting framework to be reinforced; arranging the tension member on a surface of the supporting framework and introducing each of the closure elements into a component of the traction device; tensioning the tension member with a traction device; and adhering the tensioned tension member to the supporting framework.

A method is disclosed for reinforcing a supporting framework having: a tension member made of fiber-reinforced plastic flat strip lamellas, that includes on one end a first clamping element that is arranged on the tension member and has at least one contact surface with the tension member, and at least one rigid sleeve that is arranged around the first clamping element and the tension member and that provides a clamping pressure via the first clamping element on the tension member, wherein the first clamping element is made of plastic that has a modulus of elasticity ranging from 1000 to 5000 MPa, a bending tensile strength of ≥25 MPa and a pressure resistance of ≥25 MPa, the method comprising: fastening an anchoring into edge areas of a position of the supporting framework to be reinforced; placing the tension member with the first clamping element on one of the anchorings; placing a traction device on any end of the tension member that has no clamping element; tensioning the tension member by a traction device and arranging the tension member on a non-anchored end of the tensioned tension member; placing a second clamping element on the non-anchored end of the tensioned tension member, whereby the second clamping element is arranged directly behind the anchoring opposite a direction of tension of the tension member; pushing a rigid sleeve in a direction of tension of the tension member over the second clamping element so that a clamping pressure is exerted on the tension member; and adhering the tensioned tension member to the supporting framework.

BRIEF DESCRIPTION OF THE DRAWINGS

Exemplary embodiments of the disclosure are explained in detail using the drawings. The same elements and different figures are provided with the same reference numerals. Of course, the disclosure is not limited to the exemplary embodiment shown and described.

In the figures, only elements essential for understanding of the disclosure are shown.

DETAILED DESCRIPTION

Exemplary embodiments of the disclosure relate to a device and methods for the introduction of force into tension members made of, for example, fiber-reinforced plastic flat strip lamellas and can be distinguished, for example, by a simple manufacture and arrangement on the tension member and can produce a uniform clamping pressure on the tension member.

Exemplary embodiments of the disclosure relate to a device for the introduction of force into tension members made of fiber-reinforced plastic flat strip lamellas including at least one clamping element that is arranged on the tension member and has at least one contact surface with the tension member as well as at least one rigid sleeve that is arranged around the clamping element and the tension member and as a result exercises a clamping pressure via the clamping element on the tension member, whereby the clamping element is made of plastic that has a modulus of elasticity ranging from 1000 to 5000 MPa, a bending tensile strength of ≥25 MPa and a pressure resistance of ≥25 MPa.

It was surprisingly found that the use of clamping elements made of plastic with the described qualities can exert a uniform clamping pressure and transverse pressure in the boundary surface between the tension member and the clamping element, which can make possible a very efficient and uniform introduction of force into tension members.

Furthermore, a device in accordance with an exemplary embodiment of the disclosure can have the advantage that it can be simple to manufacture and use.

Another advantage of a device in accordance with an exemplary embodiment of the disclosure is the introduction of force into the tension member can take place via the clamping element or clamping elements. According to this embodiment it is possible to attach the device of the disclosure onto already completely tensioned tension members.

In a use of the device in accordance with an exemplary embodiment of the disclosure, with appropriate tension members made of carbon fiber-reinforced plastic flat strip lamellas for the reinforcing of supporting frameworks, the plastic used for the clamping elements can ensure the galvanic separation between the electrically conductive lamella and the anchoring in the building, which anchoring can include steel. Without galvanic separation there can be the danger that the tension member becomes electrically connected via the anchorings to the inner steel reinforcement of the steel concrete structural part to be reinforced and forms a galvanic macroelement with the latter. This can lead to a very rapid, progressive corrosion of the anchorings or of the inner steel reinforcement of the steel concrete structural part.

Figure 1:
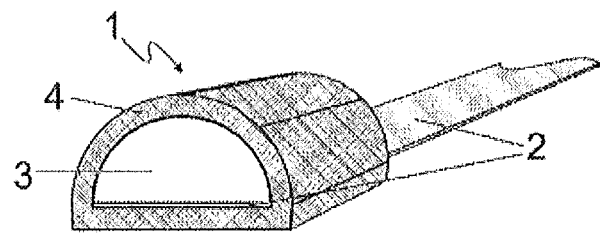
FIG. 1 schematically shows a device in accordance with an exemplary embodiment of the disclosure with a tension member.

FIG. 1 shows a device 1 for the introduction of force into tension members 2 made of fiber-reinforced plastic flat strip lamellas including a clamping element 3 which is arranged on the tension member and including a contact surface with the tension member, as well as at least one rigid sleeve 4 that is arranged around the clamping element and the tension member and as a consequence exerts a clamping pressure via the clamping element on the tension member.

According to an exemplary embodiment of the disclosure, the clamping element can be formed of plastic that has a modulus of elasticity ranging from, for example: 1000 to 5000 MPa, a bending tensile strength of ≥25 MPa, such as from, for example, 50 to 150 MPa, and a pressure resistance of ≥25 MPa (or lesser or greater range(s) provided objectives disclosed herein are satisfied).

The values indicated refer to measurements corresponding to the norms ISO 604 for the modulus of elasticity and ISO 178 for the bending tensile strength and the pressure resistance.

Basically any plastic desired with the appropriate physical qualities can be used as plastic for the clamping element, whereby it can be filled or non-filled or optionally fiber-reinforced. For example, even an elasticated mortar can be used as filled plastic.

For example, the clamping element can include a plastic having at least one polyurethane polymer. The plastic can be non-filled.

Exemplary advantages of the plastic are the high bending tensile strength and pressure resistances in comparison to the E-modulus, the very good dimensional stability, the very high swelling resistance as well as the dense surface with sliding ability. The low sliding friction makes possible the building up of large clamping forces with relatively low pressing force.

A clamping element, that is soft in comparison to the tension member and to the sleeve, can generate a uniform clamping pressure on the tension member, which can make possible a very efficient and uniform introduction of force into the tension member. This is useful, for example, in the case of tension members made of unidirectionally fiber-reinforced plastic flat strip lamellas because different tensions between the fibers can be balanced out only to a limited extent.

A suitable plastic for the manufacture of the clamping elements is commercially available from Sika Deutschland AG under the trade name SikaBlock®, for example, SikaBlock® M940, or other suitable plastic.

The clamping element can basically have any desired shape provided it is suitable for clamping the tension member in between the clamping element and the sleeve and/or between several clamping elements.

For example, the device in accordance with an exemplary embodiment of the disclosure can include one or two clamping elements that are arranged around the tension member and have at least one contact surface with the tension member.

In the exemplary embodiment of the disclosure with two clamping elements they can be designed as one half of a cylinder halved in the longitudinal direction. The level surface along which the cylinder was halved can represent in this example the contact surface of the clamping element with the tension member. Furthermore, the clamping elements, for example, all clamping elements of a device with contact surfaces that contact each other, can have a conical or wedge-shaped structure.

Figure 2:
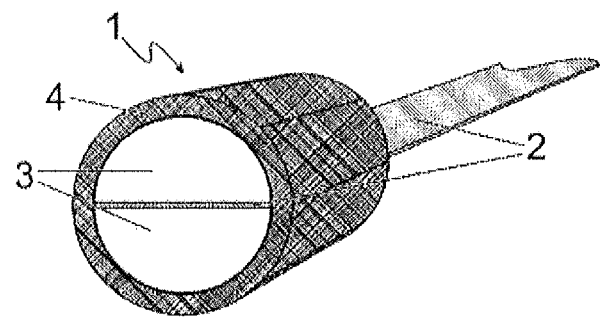
FIG. 2 schematically shows a device in accordance with an exemplary embodiment of the disclosure with a tension member.

FIG. 2 shows an exemplary embodiment of the device 1 for the introduction of force into tension members 2 made of fiber-reinforced plastic flat strip lamellas including two clamping elements 3 that are arranged around the tension member and have at least one contact surface with the tension member, as well as at least one rigid sleeve 4 that is arranged around the clamping elements and consequently exerts a clamping pressure on the tension member via the clamping elements.

The rigid sleeve of the device in accordance with an exemplary embodiment of the disclosure can be arranged around the clamping element or clamping elements and the tension member and consequently exerts a clamping pressure on the tension member via the clamping element or clamping elements.

The sleeve can include, for example, a plastic, a metal, a metal alloy or another highly rigid material. The sleeve can include fiber-reinforced plastic or steel, for example, carbon fiber-reinforced plastic on an epoxy resin basis.

The sleeve can basically be constructed as desired to the extent that it is suitable for receiving the clamping element or clamping elements with tension member and optionally friction element and for exerting a sufficient clamping pressure on the tension element. Accordingly, the sleeve may not be designed in a tubular shape but rather can be a bore or recess in an object of any shape which bore or recess is suitable for receiving the clamping elements.

Figure 3:
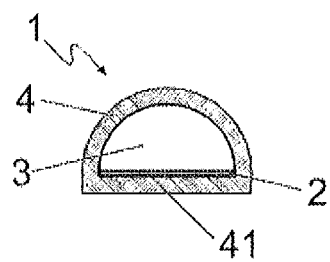
FIG. 3 schematically shows a cross-section through a device in accordance with an exemplary embodiment of the disclosure with a tension member.

For example, FIG. 3 shows a cross section through a device 1 in accordance with an exemplary embodiment of the disclosure including a tension member 2, a clamping element 3 and a sleeve 4, whereby the sleeve has the shape of a tube halved in the longitudinal direction with a level support 41 as counterpart to the clamping element.

Figure 4:
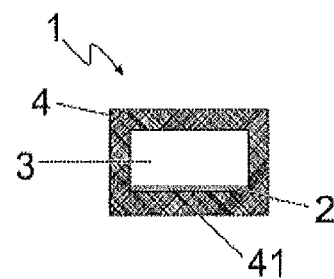
FIG. 4 schematically shows a cross-section through a device in accordance with an exemplary embodiment of the disclosure with a tension member.

FIG. 4 shows a cross section through a device 1 in accordance with the disclosure, whereby the sleeve 4 has a rectangular form with a level support 41 as counterpart to the clamping element. In this embodiment, the clamping element 3 can have the shape of a parallelepiped or of a truncated wedge.

Figure 5:
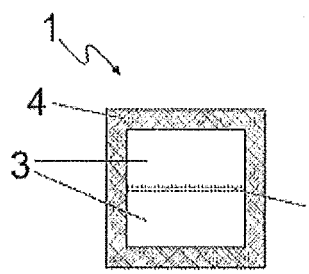
FIG. 5 schematically shows a cross-section through a device in accordance with an exemplary embodiment of the disclosure with a tension member.

FIG. 5 shows a cross section through a device 1 in accordance with an exemplary embodiment of the disclosure with a sleeve 4 that has a rectangular form, whereby this embodiment has two clamping elements 3 arranged around the tension member 2. Analogously to FIG. 4, the clamping elements 3 can have the shape of parallelepipeds or of truncated wedges.

Figure 6:
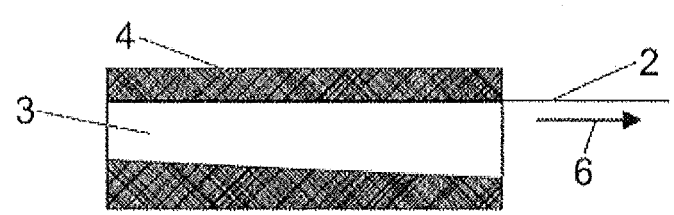
FIG. 6 schematically shows a longitudinal section through a device in accordance with an exemplary embodiment of the disclosure with a tension member.

FIG. 6 shows a longitudinal section through a device in accordance with the disclosure including a tension member 2, a clamping element 3 and a sleeve 4, whereby the clamping element has a cross-sectional reduction against the direction of tension 6 of the tension member 2. The sleeve 4 correspondingly has an inner shape suitable for receiving the clamping elements and for exerting a clamping pressure.

The rigid sleeve can be a tubular sleeve with a round cross section, whereby the inner shape of the sleeve can be a shape suitable for receiving the clamping elements with a tension member and optionally a friction element, which shape is suitable for exerting a sufficient clamping pressure on the tension member.

When using two clamping elements in the form of truncated wedges, a sleeve with a rectangular cross section can be used, whereby in this case too, the inner shape of the sleeve can have a shape suitable for receiving the clamping elements with a tension member and optionally a friction element. The sleeve can be manufactured from sufficiently stiff plates.

In order to exert an optimal clamping pressure on the tension member in an exemplary embodiment, the sleeve can have an inner shape that has a reduced cross section in comparison to the outer shape of the clamping elements with a tension member and optionally a friction element.

The difference of the diameter of the entirety of the clamping elements with tension element and optionally friction element to the inner diameter of the sleeve can be, for example, 2 to 10%, for example, approximately 5%.

During the preparation of devices in accordance with an exemplary embodiment of the disclosure, the rigid sleeve is pushed onto the clamping element, that is optionally provided with a friction element and arranged on the tension member, or the clamping element is pushed into the sleeve, which can build up the necessary clamping pressure on the tension member.

The tension member includes a fiber-reinforced plastic flat strip lamella. For example, it is unidirectionally fiber-reinforced plastic flat strip lamellas. The fiber reinforcement can take place by carbon fibers. For example, an epoxy resin matrix serves as plastic matrix.

Suitable fiber-reinforced plastic flat strip lamellas are commercially available, for example, under the trade name Sika® CarboDur® from Sika Schweiz AG, or other suitable lamellas.

An exemplary embodiment of the device in accordance with the disclosure can include a friction element in the area of the contact surfaces between the clamping element and the tension member. The friction element can have the function of increasing the friction between the clamping element and the tension member and thus preventing the tension member from slipping out of the device even in the case of especially high tension forces.

The friction element can be, for example, selected from a coating of the tension member with hard grains, a coating of the clamping elements with hard grains, and a fabric covered with hard grains, such as a net or a grid.

The hard grains can be, for example, sharp-edged grains that can be a material that has a Mohs hardness in the range of $\geq 5$, for example $\geq 7$, and $\geq 9$ (or other suitable ranges). For example, the hard grains are those including corundum or silicon carbide.

The grain size of the hard grains can be, for example, 0.05 to 1.0 mm, for example 0.2 to 0.5 mm (or other suitable ranges).

The friction element can include a coating of the clamping element with hard grains in the area of its contact surface with the tension member.

If the device is an embodiment with more than one clamping element, each one additionally can include a friction element in the area of the contact surfaces between all clamping elements and the tension member.

Figure 7:
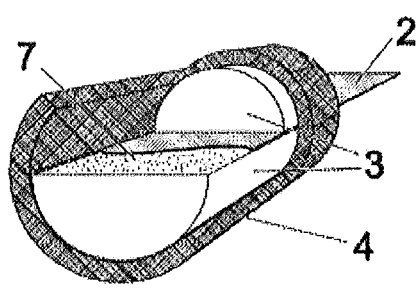
FIG. 7 schematically shows a section through the construction of a device in accordance with an exemplary embodiment of the disclosure with a friction element and a tension member.

FIG. 7 shows a schematic layer construction of a device like the one already described in FIG. 2, whereby the clamping elements 3 in this exemplary embodiment of the disclosure have a friction element 7 in the form of a coating of the clamping elements with hard grains.

The introduction of force into the tension member can take place in an exemplary embodiment via the clamping element or clamping elements of the device and not via the rigid sleeve.

Figure 8:
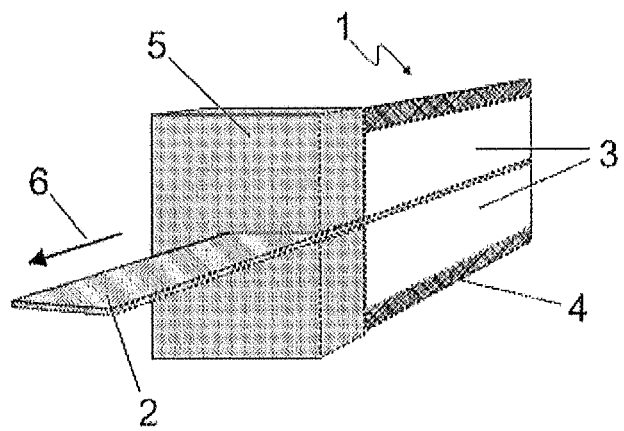
FIG. 8 schematically shows a longitudinal section through a device in accordance with an exemplary embodiment of the disclosure with a slotted plate and a tension member.

As FIG. 8 shows, the introduction of force can take place in that, viewed in the direction of tension 6 of the tension member 2, a slotted plate 5 can be arranged in front of the device 1 on which plate the clamping element or clamping elements 3 are supported. The slotted plate has a slot through which the tension member can be guided. At the same time the slotted plate supports the clamping elements 3 on the greatest possible surface.

Because even the sleeve 4 is supported at least partially on the slotted plate 5, as can be recognized in FIG. 8, it is of course apparent to a person having ordinary skill in the art that a certain transfer of force can take place even via the sleeve onto the tension members. However, the introduction of force takes place mainly via the clamping elements 3.

The slotted plate can be metal or a metal alloy. Furthermore, the slotted plate does not have to be constructed in one piece but rather can be several parts. A multi-part slotted plate can be suitable, for example, if it is to be attached to a tension member that is already ready for use and already provided with devices in accordance with the disclosure for the introduction of force.

The introduction of force into the tension member via the clamping elements of the device in accordance with the disclosure is desirable. In this exemplary embodiment according to the disclosure, the clamping elements are enclosed between the sleeve, tension member and support and have, in the case of large loads, a volume-constant, elastic and viscoplastic deformation conditioned by the physical qualities of the plastic from which the clamping elements are manufactured, which deformation can lead to a compensation of tensions between the clamping element and the tension member. This quality can improve the clamping effect of the clamping elements and therefore the efficiency of the introduction of force.

Exemplary embodiments of the device in accordance with the disclosure, can include, as was previously described, two clamping elements that are arranged around the tension member and that each have a contact surface with the tension member, whereby the contact surfaces are, for example, each provided with a friction element as well as a rigid sleeve of carbon fiber-reinforced plastic that is arranged around the two clamping elements and consequently exerts a clamping pressure on the tension member via the clamping elements.

Exemplary embodiments can be distinguished as regards the construction of the device in accordance with the disclosure. They are shown, for example, in FIGS. 9a, 9b and 9c using a device in accordance with the disclosure with two clamping elements. In an analogous manner these embodiments can be used in devices with one or more than two clamping elements.

Figure 9A:
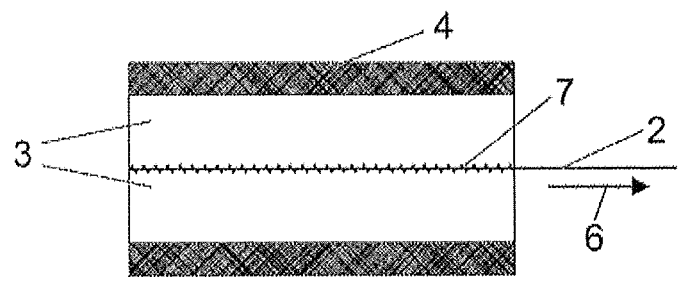
FIGS. 9a to 9d schematically show a longitudinal section through a device in accordance with an exemplary embodiment of the disclosure with a friction element and a tension member.

In the first of these embodiments, that is shown in FIG. 9a, the entirety of the clamping elements 3, that are illustrated with friction elements 7, have a cylindrical form. Furthermore, the sleeve 4 also has a cylindrical inner form.

Figure 9B:
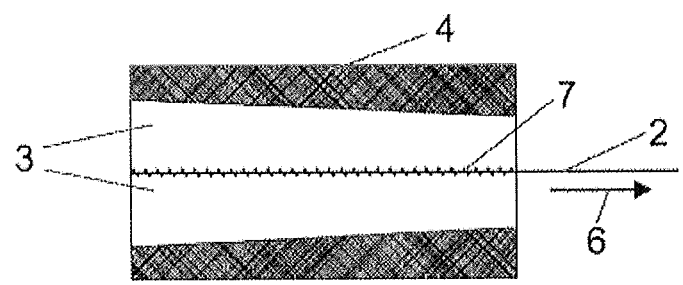

FIG. 9b shows the second of these exemplary embodiments, in which the totality of the clamping elements 3 has a conical structure, whereby the reduction in cross-section runs in the direction of tension 6 of the tension member 2. The sleeve 4 has an inner form suitable for receiving the clamping elements and for exerting a clamping pressure, for example, it also has in this case a conical recess.

Figure 9C:
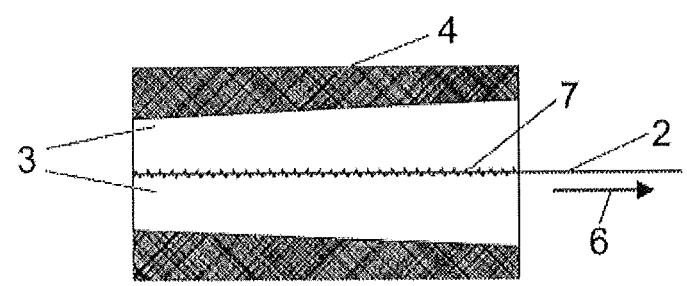

FIG. 9c shows the third of these exemplary embodiments, in which the entirety of the clamping elements have a conical structure, whereby the reduction of cross-section runs counter to the direction of tension 6 of the tension member 2. The sleeve 4 has an inner form suitable for receiving the clamping elements and for exerting a clamping pressure, that is, also a conical recess.

In the three embodiments shown in the FIGS. 9a, 9b and 9c, the diameter of the entirety of the clamping elements 3 can be greater than the inside diameter of the sleeve. As a result an optimal clamping pressure can be exerted on the tension member 2.

The embodiment shown in FIG. 9a can be manufactured in a very simple manner. For example, in this embodiment the manufacture of the sleeve is simple because it can be obtained by decomposing, for example, a tube of suitable material.

In the embodiments shown in FIGS. 9b and 9c, the outside of the entirety of the clamping elements and the inner form of the sleeve can have a wedge taper ranging from 1:4 to 1:200, for example, ranging from 1:100 (or other suitable ranges).

The embodiments with a wedge taper can have the advantage in comparison to the embodiments without a wedge taper that the pressing on or drawing on of the sleeve over the clamping elements with tension member and optionally with friction element or pressing the latter into the sleeve can be easier.

In order to make possible an easier pressing on or drawing on of the sleeve onto the clamping elements, the sleeve can have an additional recess on its inside suitable to this end on the side from which it is pushed onto the clamping elements or drawn onto them. A suitable recess constitutes a so-called chamfer.

For the same reason the clamping element or clamping elements can have such a recess on the side from which they are pushed into the sleeve or from which the sleeve is pushed or drawn over the clamping elements. In particular, this recess is also constructed as a chamfer.

Figure 9D:
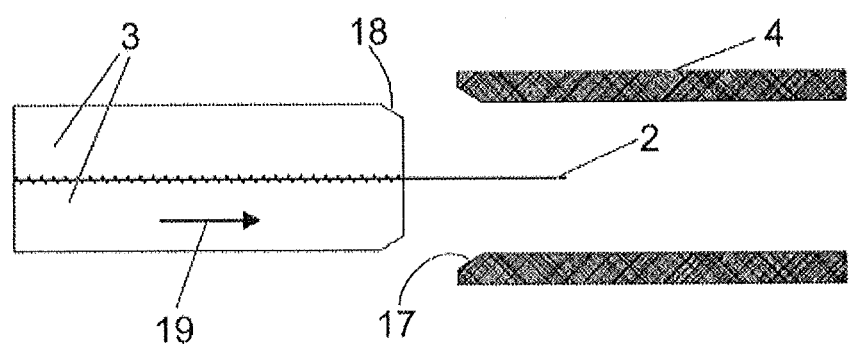

FIG. 9d shows an analogous exemplary embodiment to the one in FIG. 9a before the clamping elements 3 were driven in the direction of driving in 19 into the sleeve 4, whereby the sleeve can be provided with a chamfer 17 that can make possible an easier driving in of the clamping elements. Furthermore, the clamping elements can also be provided with a chamfer 18 for the same purpose, The entirety of the clamping elements 3, that are illustrated with friction elements 7, have a cylindrical outer form. Furthermore, the sleeve 4 also has a cylindrical inner form.

Furthermore, exemplary embodiments of the present disclosure relate to the use of a device like the one previously described for the introduction of force into tension members made of fiber-reinforced plastic flat strip lamellas.

The device in accordance with the disclosure can be attached to any position of the plastic flat strip lamella according to where the introduction of force is to take place. For example, the device can form the closure element of the tension member.

Furthermore, the device in accordance with the disclosure can also be used to connect several tension members made of plastic flat strip lamellas to each other. To this end, the tension members are arranged overlapping each other at least over the entire length of the device. Thereafter, a device in accordance with an exemplary embodiment of the disclosure can be attached at the position of the overlapping. In particular in the case of such a usage, a friction element in accordance with the previous description can be inserted between the tension members to be connected.

Furthermore, exemplary embodiment of the present disclosure relate to a tension member made of fiber-reinforced plastic flat strip lamellas, including at least one device like the one previously described.

For example, a tension member is one that has a closure element on at least one end, in particular at both ends, whereby this closure element is a device in accordance with the previous description.

Exemplary embodiments of the present disclosure also relate to a tension member arrangement including two or more tension members connected to each other by the device in accordance with the disclosure.

Exemplary embodiments of the present disclosure also relate to a method for the introduction of force into tension members made of fiber-reinforced plastic flat strip lamellas, including:

i) Placing of the tension member on at least one clamping element made of plastic according to exemplary embodiments of the disclosure, so that the clamping element has at least one contact surface with the tension member;

ii) Pushing or drawing a rigid sleeve over the at least one clamping element and the tension member so that a clamping pressure is exerted on the tension member;

iii) Placing a tension device on the at least one clamping unit with sleeve arranged on the tension member; and iv) Introduction of force into the tension member by the tension device, whereby the introduction of force takes place in particular via the at least one clamping element.

This described method is suitable, for example, for the embodiments shown in the FIGS. 9a, 9b, and 9c in the same manner.

Another exemplary embodiment of a method for the introduction of force into tension members made of fiber-reinforced plastic flat strip lamellas, which is also subject matter of the present disclosure and is suitable, for example, for being used with devices like those described, for example, in FIGS. 9a and 9c, includes:

i') Making a tension member available that is anchored by one end on a supporting framework;

ii') Placing a tension device on the non-anchored end of the tension member;

iii') Tensioning the tension member by the tension device;

iv') Placing at least one clamping element made of plastic according to an exemplary embodiment of the disclosure on the non-anchored end of the tensioned tension member so that the clamping element has at least one contact surface with the tension member;

v') Pushing or drawing a rigid sleeve over the at least one clamping element and the tension member so that a clamping pressure is exerted on the tension member;

vi') Anchoring of the non-anchored end of the tension member.

Exemplary embodiments of the device in accordance with the disclosure with two clamping elements can be suited for the two previously described methods.

Furthermore, in the described methods, a traction device can be placed only on one end of the tension member. The tension member is anchored on the other end of the tension member, for example, also using a device in accordance with the disclosure as closing element.

FIGS. 10a to 10e schematically show a method according to an exemplary embodiment of the disclosure for the introduction of force into tension members made of, for example, fiber-reinforced plastic flat strip lamellas and in particular for being used with the devices like those described in FIGS. 9a and 9c. This shows an embodiment of the device in accordance with an exemplary embodiment the disclosure with two clamping elements. Methods using devices with one or more than two clamping elements can run in an analogous manner.

Figure 10A:
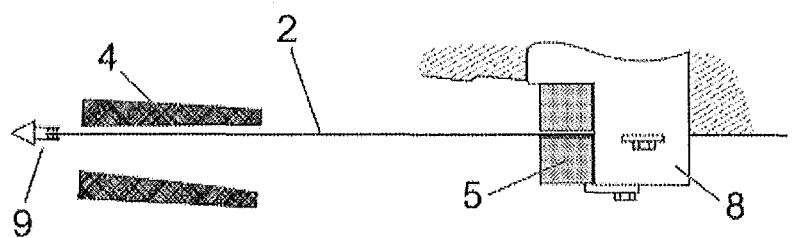
FIGS. 10a to 10e schematically show the steps of a method according to an exemplary embodiment of the disclosure for the introduction of force into tension members made of fiber-reinforced plastic flat strip lamellas in longitudinal section.

FIG. 10a shows a tension member 2 anchored on one side that was tensioned by tension device 9, which also represents the tensioning direction of the tensioning member with an arrow tip, and is held in the tensioned state. The direction of the tensioning of the tension member runs in the opposite direction to the tension direction of the tension member. Furthermore, FIG. 10a shows a holding device 8 that holds the tension member in the desired position and serves as a fastener for the slotted plate 5 as well as for sleeve 4, through which the tension member 2 was guided.

Figure 10B:
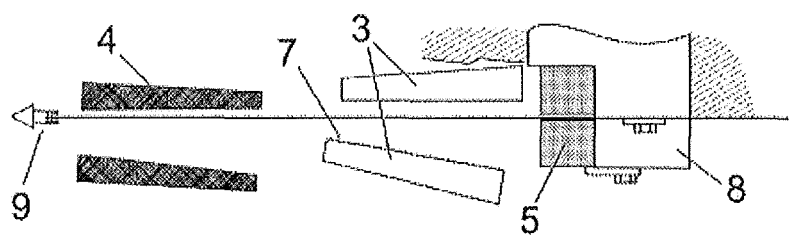

In addition to FIG. 10a, FIG. 10b shows two clamping elements 3 that are each provided with a friction element 7 and are about to be arranged around the tension member 2.

Figure 10C:
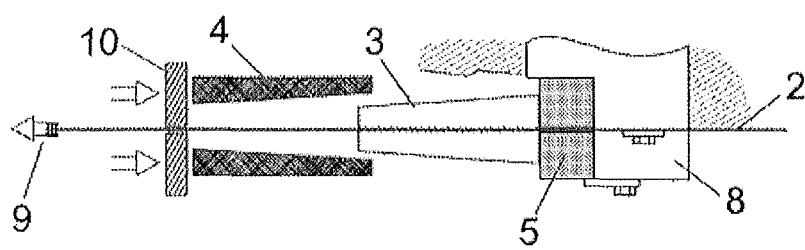

Furthermore, FIG. 10c shows the clamping elements 3 brought into their end position and the sleeve 4, which is pushed over the clamping elements. The sleeve can be pushed over the clamping elements with any suitable device. This can take place, for example, by a second slotted plate 10.

Figure 10D:
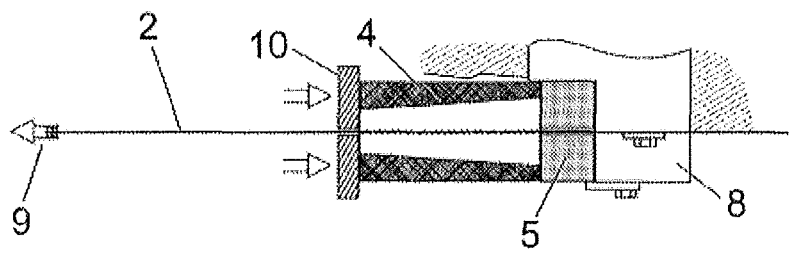
Figure 10E:
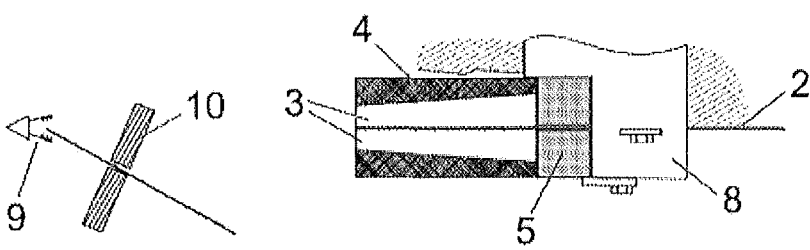

FIG. 10d shows the device 1 in accordance with the disclosure as it is arranged ready on the tension member. In this state the second slotted plate 10 and the tension device 9 can be removed. The excess of the tension member between the device in accordance with the disclosure and the tension device can be removed. This is shown in FIG. 10e.

Furthermore, the present disclosure relates to a method for connecting two or more tension members, whereby the tension members are connected to each other by a device like the one previously described. Such a method can include, for example, i) Making two or more tension members available that are arranged overlapping each other;
ii) Placing at least one clamping element made of plastic according to an exemplary embodiment of the disclosure on the position at which several tension members overlap so that the clamping element has at least one contact surface with one of the tension members lying on the outside; and
iii) Pushing or drawing a rigid sleeve over the at least one clamping element and the tension members so that a clamping pressure is exerted on the tension members.

The tension members can be tensioned or pretensioned in the described method for connecting two or more tension members. Furthermore, a friction element such as was previously described can be inserted between the tension members.

Figure 11A:
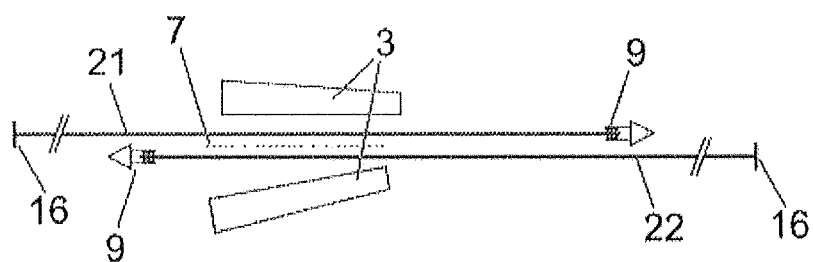
FIGS. 11a to 11c schematically show the steps of a method according to an exemplary embodiment of the disclosure for connection of two tension members by a device in accordance with the disclosure.
Figure 11B:
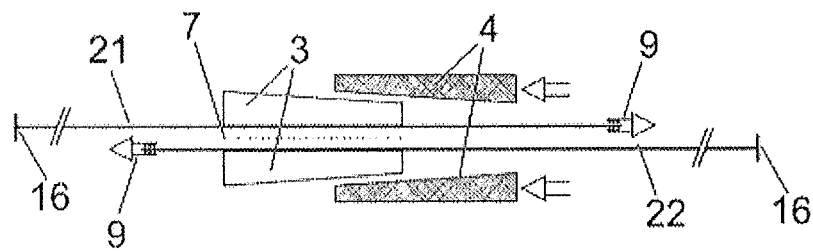
Figure 11C:
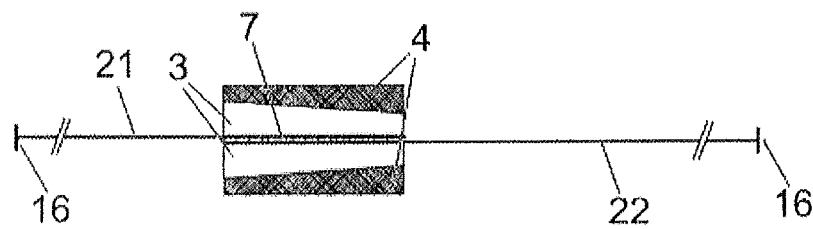

For example, such a method is described in the FIGS. 11a, 11b and 11c.

FIG. 11a shows two tension members 21 and 22 that are oppositely fastened by anchoring 16. The fastening can take place on a supporting framework. The tension members can be tensioned and held in the tensioned state by tension device 9 that also represents the tensioning direction of the corresponding tension member with an arrow tip. A friction element 7 is located in the overlapping area of the tension members. In addition, FIG. 11 a shows two clamping elements 3 that are about to be arranged around the overlapping area of the tension members 21 and 22. The clamping elements can also be provided with a friction element.

Furthermore, FIG. 11b shows the clamping elements 3 brought into their end position and sleeve 4 that is pushed over the clamping elements.

FIG. 11c shows the two tension members 21 and 22 connected to each other by the device in accordance with the disclosure. The tension devices 9 were removed.

Devices in accordance with an exemplary embodiment of the disclosure in combination with tension members made of fiber-reinforced plastic flat strip lamellas can be suitable for the reinforcing of supporting frameworks, for example, for supporting frameworks of concrete. Such systems can be used in the renovation of existing supporting frameworks such as, for example, bridges or roofs. Furthermore, described systems can also be used for the reinforcing of wall structures, wooden supporting frameworks, steel constructions, earthquake reinforcements and the like.

The fastening of the previously described tension members in accordance with the disclosure to the supporting framework can take place via anchorings such as are already known to a person having ordinary skill in the art.

Figure 12A:
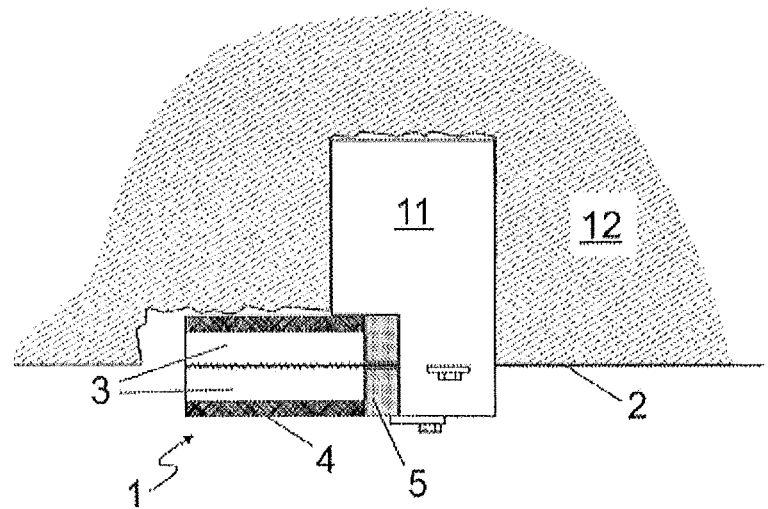
FIGS. 12a and 12b schematically show an anchoring of a tension member with a device in accordance with an exemplary embodiment of the disclosure for the introduction of force on a supporting framework to be reinforced, in longitudinal section and in a top view.
Figure 12B:
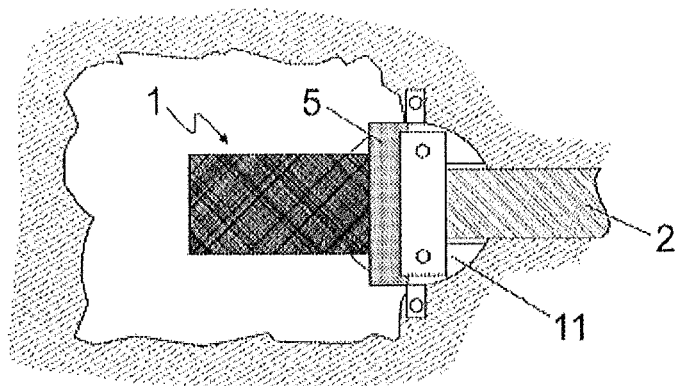

FIGS. 12a and 12b show, for example, the anchoring of a tension member 2, which is provided with a device 1 in accordance with the disclosure for the introduction of force, on a supporting framework 12. An exemplary embodiment of the device with two clamping elements is shown.

An anchoring 11 is attached to the supporting framework 12 that holds the tension member 2 in the desired position and serves as a fastener for the slotted plate 5. The device 1 for the introduction of force and that constitutes the closure element of the tension member 2 is arranged, viewed in the direction of traction of the tension member, behind the anchoring 11 and behind the slotted plate 5. The introduction of force into the tension member takes place here via the clamping elements 3 by their support on the slotted plate 5.

Furthermore, the fastening of the tension member can have a traction element 13 that makes the tensioning of the tension member possible.

Figure 13A:
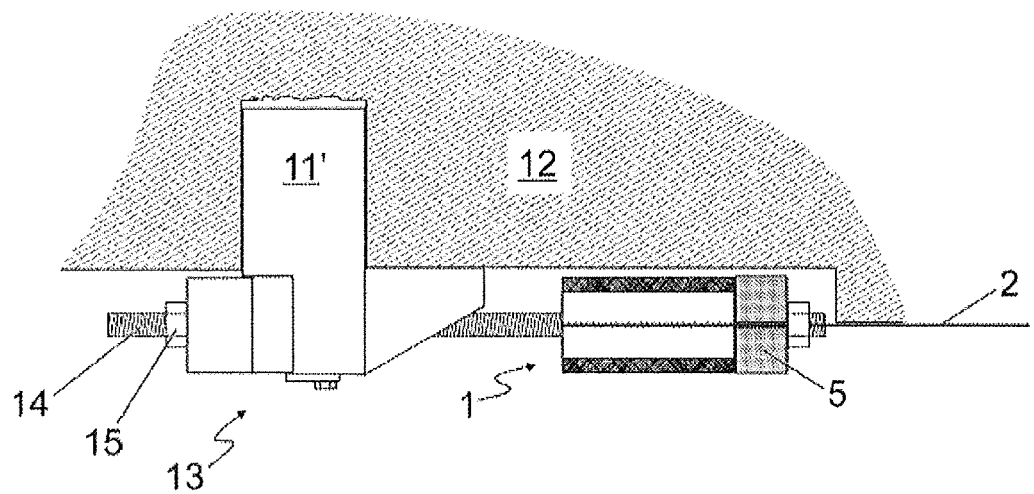
FIGS. 13a and 13b schematically show a tension element for a tension member with the device in accordance with an exemplary embodiment of the disclosure for the introduction of force on a supporting framework to be reinforced, in longitudinal section and in a top view.
Figure 13B:
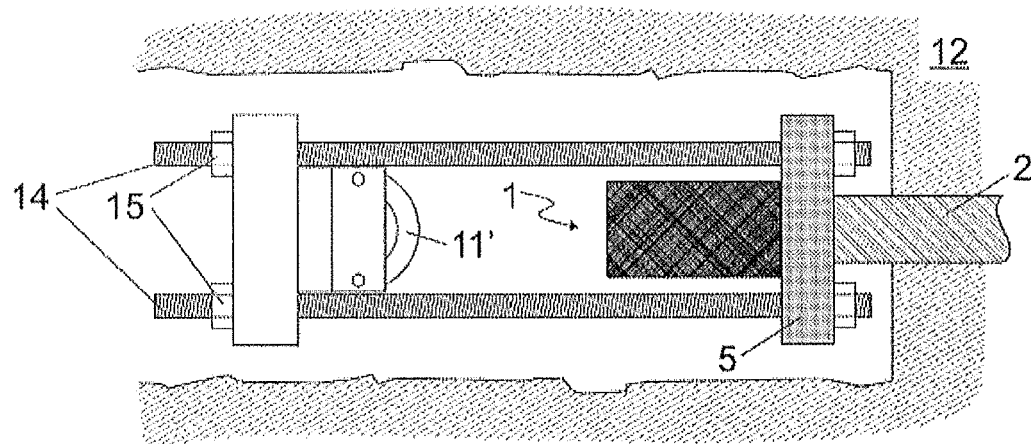

FIGS. 13a and 13b show, for example, a suitable traction element for tensioning a tension member, which is provided with a device 1 in accordance with the disclosure for the introduction of force, to a supporting framework 12 to be reinforced.

In contrast to the anchoring described in FIGS. 12a and 12b, in the case of the traction element, the slotted plate 5 is not located directly on the anchor 11' of the traction element but can be connected via two threaded rods 14 to the anchor. The tensioning of the tension members can take place by tightening the screw nut 15. The introduction of force into the tension member also takes place here via the clamping elements 3 by their support on the slotted plate 5.

Accordingly, exemplary embodiments of the present disclosure also relate to a method for reinforcing supporting frameworks 12, including:

i) Making a tension member 2 available that includes a device 1 in accordance with the disclosure and in accordance with the previous description as a closure element;

ii) Fastening a bipartite traction device including anchoring 11 and traction element 13 in the edge areas of the position of the supporting framework 12 to be reinforced;

iii) Arranging the tension member 2 on the surface of the supporting framework 12 and introduction of each the closure elements into a component of the traction device;

iv) Tensioning of the traction member 2; and v) Adhering of the tensioned tension member to the supporting framework 12.

If the reinforcing of the supporting framework takes place by a method like the one shown in FIGS. 10a to 10e, anchorings can be used on both sides for anchoring the tension member, as was previously described and shown in the FIGS. 12a and 12b. The use of a traction element is not necessary in this case, which can represent a particular advantage of this embodiment for reasons of cost. The traction device used for tensioning the tension member can be removed again after the tensioning and fixing.

Accordingly, the exemplary embodiments of present disclosure relate to a method for reinforcing supporting frameworks 12, including:

i') Making available a tension member 2 made of fiber-reinforced plastic flat strip lamellas, that including on one end, a device in accordance with exemplary embodiment of the disclosure and according to the previous description;

ii') Fastening an anchoring 11 into the edge areas of the position of the supporting framework 12 to be reinforced and placing the tension member 2 with the closure element on one of the anchorings 11;

iii') Placing a traction device on the end of the tension member 2 that has no closure element;

iv') Tensioning of the tension member by a traction device and arranging the tension member 2 on the not yet occupied anchoring;

v') Placing at least one clamping element 3 of plastic in accordance with an exemplary embodiment of the disclosure on the non-anchored end of the tensioned tension member, whereby the clamping element is arranged directly behind the anchoring opposite the direction of tension of the tension member;

vi') Pushing a rigid sleeve 4 in the direction of tension of the tension member over the at least one clamping element 3 so that a clamping pressure is exerted on the tension member 2; and vii') Adhering of the tensioned tension member to the supporting framework 12.

The adhering of the tension member to the supporting framework takes place with a method known to a person having ordinary skill in the art. In particular, two-component adhesives based on epoxy resin can be used for this, such as are commercially obtainable, for example, under the trade name Sikadur® of Sika Schweiz AG.

Thus, it will be appreciated by those having ordinary skill in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

1 device for the introduction of force
2 tension member
1, 22 tension member
3 clamping element
4 sleeve
41 support
5 slotted plate
6 direction of tension of the tension member
7 friction element
8 holding device
9 traction device
10 second slotted plate
11 anchoring
11' anchor
12 supporting framework
13 traction element
14 threaded rod
15 screw nut
16 anchoring
17 chamfer (sleeve)
18 chamfer (clamping element)
19 direction of driving in

What is claimed is:

1. A device for introducing force into a tension member made with a fiber-reinforced plastic flat strip lamella, comprising:

two clamping elements for arrangement around the tension member, each having a planar contact surface for contacting the tension member, wherein the clamping elements are made of plastic that has a modulus of elasticity ranging from 1000 to 5000 MPa, a bending tensile strength of >25 MPa and a pressure resistance of >25 MPa;

a rigid sleeve for arrangement around the two clamping elements and configured for exerting a clamping pressure on the tension member via the clamping elements;

wherein the clamping elements each form a semi-cylindrical structure that together form a cylindrical outer surface, and the sleeve has an inner shape configured to receive the cylindrical outer surface of the two clamping elements and configured for exerting a clamping pressure; and wherein the at least one clamping element and the at least one rigid sleeve each include respective chamfered edges.

2. The device according to claim 1, wherein the at least two clamping elements of the device are arranged to introduce force into the tension member.

3. The device according to claim 1, wherein the two clamping elements comprise:

at least one polyurethane polymer.

4. The device according to claim 1, comprising:

a friction element provided on the contact surfaces for placement between the clamping elements and the tension member.

5. The device according to claim 4, wherein the friction element is at least one of:

a coating of the tension member with hard grains;

a coating of the clamping elements with hard grains; and a fabric covered with hard grains.

6. A tension member made of fiber-reinforced plastic flat strip lamellas, comprising, in combination, at least one device of claim 1.

7. A tension member arrangement comprising in combination:

two or more tension members connected to each other by at least one device of claim 1, and a friction element arranged between one tension member of the two or more tension members and an adjacent tension member of the two or more tension members.

8. The device according to claim 1, comprising:
a plate including a slot through which the tension member can be guided, the plate arranged to support the at least one clamping element.

9. The device according to claim 1, comprising:
the tension member.

10. The device according to claim 1, wherein an exterior of the sleeve and an exterior of the two clamping elements is cylindrical.

11. A method for introduction of force into tension members made of fiber-reinforced plastic flat strip lamellas, using a device having a rigid sleeve for arrangement around two clamping elements and configured for exerting a clamping pressure on the tension member via the clamping elements;
wherein the clamping elements each form a semi-cylindrical structure that together form a cylindrical outer surface, and the sleeve has an inner shape configured to receive the cylindrical outer surface of the two clamping elements and configured for exerting a clamping pressure; and
wherein the at least one clamping element and the at least one rigid sleeve each include respective chamfered edges, the method comprising:
placing a tension member on at least one clamping element made of plastic having a modulus of elasticity ranging from 1000 to 5000 MPa, a bending tensile strength of >25 MPa and a pressure resistance of >25 MPa so that the clamping element has at least one contact surface with the tension member;
pushing or drawing a rigid sleeve over the at least one clamping element and the tension member so that a clamping pressure is exerted on the tension member;
placing a tension device on the at least one clamping element with the sleeve arranged on the tension member; and
introducing a force into the tension member by the tension device.

12. The method according to claim 11, comprising:
inserting the tension member between two clamping elements so that the clamping elements have a contact surface with the tension member, and the pushing or drawing of the rigid sleeve takes place via the two clamping elements so that a clamping pressure is exerted on the tension member.

13. The method according to claim 12, comprising:
inserting the tension member between two clamping elements so that the clamping elements have a contact surface with the tension member, wherein the pushing or drawing of the rigid sleeve takes place via the two clamping elements so that a clamping pressure is exerted on the tension member.

14. A method for introduction of force into tension members made of fiber-reinforced plastic flat strip lamellas, using a device having a rigid sleeve for arrangement around two clamping elements and configured for exerting a clamping pressure on the tension member via the clamping elements;
wherein the clamping elements each form a semi-cylindrical structure that together form a cylindrical outer surface, and the sleeve has an inner shape configured to receive the cylindrical outer surface of the two clamping elements and configured for exerting a clamping pressure; and
wherein the at least one clamping element and the at least one rigid sleeve each include respective chamfered edges, the method comprising:
providing a tension member that is anchored by one end on a supporting framework;
placing a tension device on a non-anchored end of the tension member;
tensioning the tension member by the tension device;
placing at least one clamping element made of plastic having a modulus of elasticity ranging from 1000 to 5000 MPa, a bending tensile strength of >25 MPa and a pressure resistance of >25 MPa on the non-anchored end of the tensioned tension member so that the clamping element has at least one contact surface with the tension member;
pushing or drawing a rigid sleeve over the at least one clamping element and the tension member so that a clamping pressure is exerted on the tension member; and
anchoring a non-anchored end of the tension member.

15. A method for reinforcing a supporting framework, using a device having a rigid sleeve for arrangement around two clamping elements and configured for exerting a clamping pressure on a tension member via the clamping elements;
wherein the clampinq elements each form a semi-cylindrical structure that together form a cylindrical outer surface, and the sleeve has an inner shape configured to receive the cylindrical outer surface of the two clamping elements and configured for exerting a clamping pressure; and
wherein the at least one clamping element and the at least one rigid sleeve each include respective chamfered edges, the method, comprising:
providing a tension member made of fiber-reinforced plastic flat strip lamellas;
arranging at least one clamping element on the tension member, the clamping element having at least one contact surface with the tension member;
arranging at least one rigid sleeve around the clamping element and the tension member and providing a clamping pressure via the clamping element on the tension member, wherein the clamping element is made of plastic that has a modulus of elasticity ranging from 1000 to 5000 MPa, a bending tensile strength of >25 MPa and a pressure resistance of >25 MPa;
fastening a bipartite traction device including an anchoring and traction element in edge areas of a position of the supporting framework to be reinforced;
arranging the tension member on a surface of the supporting framework and introducing each of the closure elements into a component of the traction device;
tensioning the tension member with a traction device; and
adhering the tensioned tension member to the supporting framework.

16. A method for reinforcing a supporting framework having:
a tension member made of fiber-reinforced plastic flat strip lamellas, that includes on one end a first clamping element that is arranged on the tension member and has at least one contact surface with the tension member, and at least one rigid sleeve that is arranged around the first clamping element and the tension member and that provides a clamping pressure via the first clamping element on the tension member, wherein the first clamping element is made of plastic that has a modulus of elasticity ranging from 1000 to 5000 MPa, a bending tensile strength of >25 MPa and a pressure resistance of >25 MPa;

wherein two clamping elements each form a semi-cylindrical structure that together form a cylindrical outer surface, and the sleeve has an inner shape configured to receive the cylindrical outer surface of the two clamping elements and configured for exerting a clamping pressure; and wherein the at least one clamping element and the at least one rigid sleeve each include respective chamfered edges, the method comprising:

fastening an anchoring into edge areas of a position of the supporting framework to be reinforced;

placing the tension member with the first clamping element on one of the anchorings;

placing a traction device on any end of the tension member that has no clamping element;

tensioning the tension member by a traction device and arranging the tension member on a non-anchored end of the tensioned tension member;

placing a second clamping element on the non-anchored end of the tensioned tension member, whereby the second clamping element is arranged directly behind the anchoring opposite a direction of tension of the tension member;

pushing a rigid sleeve in a direction of tension of the tension member over the second clamping element so that a clamping pressure is exerted on the tension member; and adhering the tensioned tension member to the supporting framework.

* * * * *